Dec. 3, 1968   A. R. USDAVIN   3,413,906
MOLD RETARDANT BREAD BOX
Filed April 12, 1965
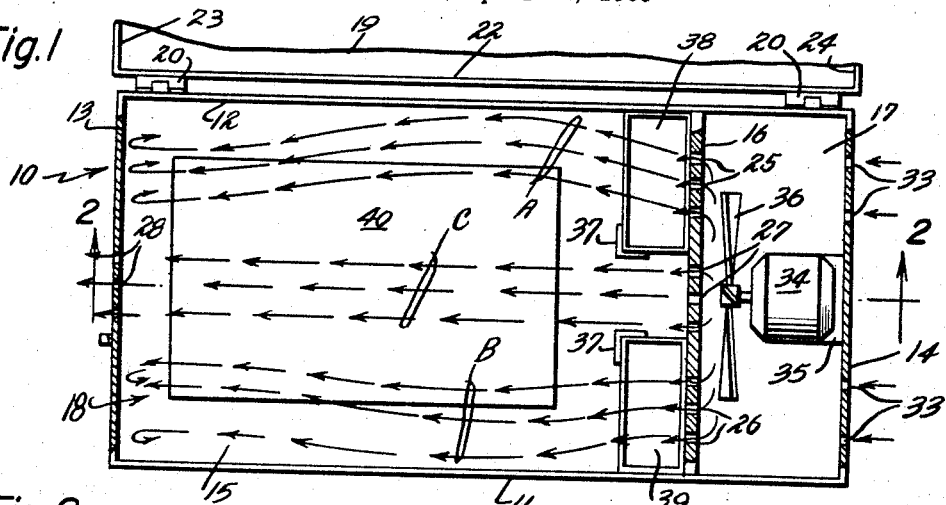
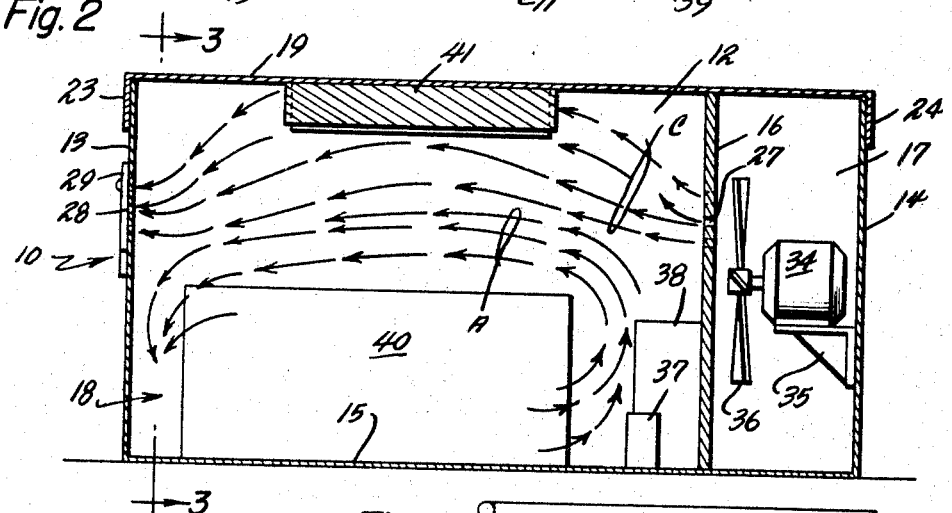
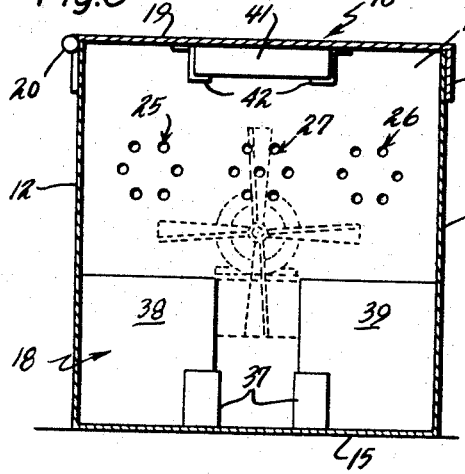
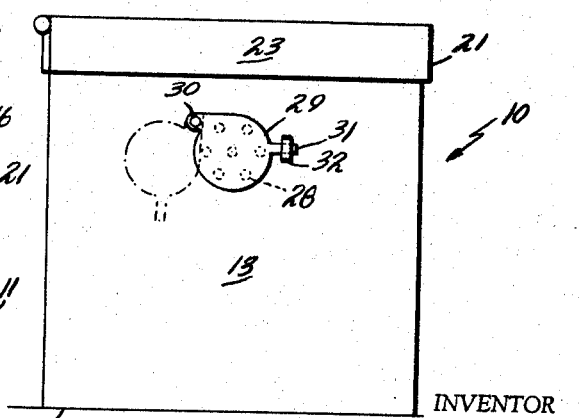
INVENTOR
Alexander R. Usdavin
BY John A. Mackinney
ATTORNEY

3,413,906
MOLD RETARDANT BREAD BOX
Alexander R. Usdavin, 2148 O St. NW., Apt. 401, Washington, D.C. 20037
Filed Apr. 12, 1965, Ser. No. 447,324
6 Claims. (Cl. 99—249)

The present invention relates to mold retardant bread box for maintaining foodstuffs in a mold retardant state so as to retain their palatability and freshness over an increased length of time.

One object of the present invention is to provide means for preserving bakery products and other perishable goods and especially means for retarding the development of mold on the food products.

Although research workers have studied the problem of spoilage of bakery products for many years, they have not been able in the past to reduce to any appreciable degree the qauntity of bakery products wasted in the United States, amounting to millions of pounds every week. In the production of these products it has been found impossible to prevent disposition of mold spores. Mold does not develop on bread that is unwrapped and left to dry out in the open air, but the drying out of bread in open air causes it to become stale and unfit for food. No means have been known in the past for treating bread to prevent mold growth without allowing it to dry out rapidly or tainting it so much as to render it unsalable.

With these problems in mind the inventor has developed a bread or pastry box which is designed to retard the growth of mold on products placed therein, as well as to prevent the bread, pastries, etc., from drying out too quickly. The box can be designed for both home and commercial use and should find a ready welcome.

In order to have such foods, particularly bread and pastries remain in a fresh state for an extended period of time care must be taken in creating an environment wherein the air surrounding the bread contains a suitable balance of air and moisture plus a chemical additive mold retardant or mycostat, such as sodium benzoate in a correct proportion to the confined air space wherein the bread is stored.

The arrangement of the present invention is such that the desired conditions above set forth are maintained and the bread may be served at any time at its very best.

It is accordingly the principal object of my invention to provide a bread box of the character described which overcomes the above mentioned disadvantages and inconveniences of the ordinary bread box.

It is another object of my invention to provide a bread box of the above nature wherein a balanced state of moisture is created in the container, and the chemical and moisture laden air is continually recirculated through the food containing area of the box so that the supply of mold retardant and the liquid providing the moisture are conserved.

With these and other objects in view, there is described herein in conjunction with the accompanying drawings a preferred form of the invention.

In the drawings wherein like reference numerals designate like and corresponding parts throughout the several views:

FIGURE 1 is a top plan view with the hinged cover opened and with parts broken away and parts shown in section;

FIGURE 2 is a sectional view taken on the line 2—2 of FIGURE 1 with the hinged cover shown in the closed position;

FIGURE 3 is a sectional view taken on the line 3—3 of FIGURE 2; and

FIGURE 4 is an end view of the left end of the invention as viewed in FIGURE 2 of the drawings.

Considering now the embodiment of the invention as illustrated in the drawings, the numeral 10 designates a container comprising a front wall 11, a rear wall 12, end walls 13 and 14, a bottom 15 and a partition or dividing wall 16 which divides the container 10 into a blower or fan compartment 17 and a food storage compartment 18. The container 10 is provided with a cover or lid 19 which is swingably connected to the rear wall 12 of the container by hinges 20 so that the cover can be swung from the closed position shown in FIGURES 2 and 3 of the drawings to the open position illustrated in FIGURE 1 so that access can be had to the compartments 17 and 18.

The cover 19 is provided with a front flange 21, a rear flange 22, end flanges 23 and 24, depending from the cover and frictionally engaging the front wall 11, the rear wall 12, and the end walls 13 and 14, respectively, of the container 10 so that the cover 19 is held in its closed position in substantially air-tight relation to the container.

As particularly shown in FIGURES 1 and 3 of the drawings, the partition 16 is provided with three groups of apertures or openings 25, 26 and 27, which are transversely spaced apart as is clear from FIGURE 3 of the drawings and are disposed above the medial horizontal plane of the container. A group of apertures or openings 28 are formed in the end wall 13 of the container which are in substantial alignment with the group of openings 27 in the partition 16. A closure in the form of a disk or plate 29 is pivotally mounted as at 30 to the outer face of the end wall 13 for masking and unmasking the apertures 28. The closure 29 has a finger piece 31 extending from the perimeter thereof by which the closure can be moved between its two extreme positions of masking and unmasking the apertures 28, as shown in full and dotted lines in FIGURE 4 of the drawings. The finger piece 31 is received by a conventional spring clip 32 when the closure is in its masking position so that the closure is releasably held in such masking position.

A group of apertures or openings 33 are formed in the end wall 14. An electric motor 34 or other suitable source of power is mounted on the end wall 14 within the compartment 17 by a suitable bracket 35 for driving a fan or blower 36.

A pair of upstanding right angle brackets 37 are secured as by welding or the like to the bottom 15 of the container 10 within the storage compartment 18 for retaining a pair of liquid receptacles 38 and 39. The brackets 37 are spaced from the partition 16 and from the front and rear walls 11 and 12, respectively, to accommodate the receptacles 38 and 39 to permit facile insertion and removal but yet restrain the receptacles against shifting from their positions against the adjacent face of the partition.

In the operation of the device, the cover 19 will be raised, the foodstuff to be preserved, such as a loaf of bread 40 is placed on the bottom 15 of the compartment 18. The receptacles 38 and 39 will then be filled with a mold retardant or mycostat in liquid form, such as, sodium benzoate, calcium propionate or sorbic acid and the cover will then be closed. The closure 29 will then be swung to the dotted line position of FIGURE 4 of the drawings to unmask the openings 28 and the motor 34 started so that ambient air is drawn or induced through the openings 33 in the end wall 14 by the fan 36. This induced air is forced through the groups of openings 25, 26 and 27 in the partition in three separate streams A, B and C, respectively. The stream A passes above the upper surface of the liquid in the receptacle 38 and the stream B passes above the upper surface of the liquid in the receptacle 39 and the two streams of air A and B will pick up or entrain some of the liquid and carry it in substantially vapor form through the food storage compartment 18 over the bread or other foodstuff and the heavier particles of the mold retardant liquid will fall upon the bread 40 and other foodstuff in the compartment 18 so as to form a protective coating on the foodstuff to prevent the formation of mold thereon.

The openings 25 and 26 are spaced above the upper edges of the receptacles 38 and 39 sufficiently so that, while the chemical in vapor form is picked up by the air current passing through the openings 25 and 26, an excess of the chemical is not picked up by the air and the air current does not cause spilling over of the chemical. In other words, an aspirated action is induced.

The major portion of the stream A of mold retardant laden air will travel longitudinally of the compartment 18 adjacent to the rear wall 12 and impinge upon the blank inner face of the end wall 13 to one side of the group of apertures 28 in the end wall 13 so that the stream A will be deflected for the most part in a direction substantially opposite to its initial direction of flow thus again passing over the foodstuff to effect a further deposit of the mold retardant upon the foodstuff.

In the same manner the mold retardant laden stream of air B will travel longitudinally through the compartment 18 adjacent to the front wall 11, making an initial deposit of mold retardant material on the foodstuff, then impinging against the blank portion of the end wall 13 on the opposite side of the apertures 28 to be deflected thereby to reverse its direction of flow for its second run over the foodstuff. It will be seen that only a relatively small proportion of the mold retardant laden streams of air A and B escape through the apertures 28 so that the most efficient use is made of the mold retardant material to effect a saving of the material and the time required to replenish the supply of mold retardant material.

It will be noted that the adjacent inner ends of the receptacles are spaced apart a substantial distance so that the air stream C from the apertures 27 will not pass over the receptacles 38 and 39 so that the air stream C will pick up none or very little of the mold retardant and will flow longitudinally through the compartment 18 substantially directly to and through the apertures 28. One of the functions of the air stream C is to fill the longitudinal medial portion of the compartment 18 to prevent the mold retardant streams A and B from escaping through the apertures 28 into the ambient atmosphere and thus wasting the mold retardant material.

If it is desired to introduce moisture into the compartment 18, one of the receptacles 38 or 39 can be filled with water instead of a mold restardant. The operation will be the same as described above.

In the event there is too much moisture in the ambient air, an air drying agent or desiccant, such as, silica gel, in the form of an absorbing pad 41 can be removably positioned on the inner face of the cover 19 by means of a pair of spaced apart Z-shaped brackets 42 which may be secured to the inner face of the cover 19 by welding or the like.

Various changes may be resorted to within the spirit and scope of the invention as defined by the appended claims.

What I claim is:

1. A foodstuff preserving box comprising a container, a partition dividing the container into a foodstuff storage compartment and a blower receiving compartment, said partition having openings therethrough communicating said compartments, a blower in said blower compartment adjacent said partition, and at least one receptacle for receiving a mold retardant therein positioned in the path of air flow from the blower so that the air from the blower will pass through said openings in the partition, over the said mold retardant, vaporize some of the retardant, entrain the vaporized mold retardant and pass over the foodstuff in the foodstuff compartment and deposit at least some of the entrained vaporized mold retardant on the foodstuff.

2. A foodstuff preserving box as claimed in claim 1, wherein said container includes at least one end wall having at least one aperture therein, cooperating with the blower and the openings in the partition to produce the air flow through the foodstuff compartment, the major portion of the air from the blower impinges on the blank portion of said end wall after its passage through the foodstuff compartment so that the direction of travel of the air laden with the mold retardant will be substantially reversed to cause the air to pass again over the foodstuff to deposit more of the mold retardant on the foodstuff.

3. A foodstuff preserving box comprising a container including two end walls having apertures therethrough, a partition dividing the container into a foodstuff storage compartment and a blower receiver compartment and having openings therethrough communicating said compartments with one another, a blower in said blower compartment adjacent one of said end walls for inducing a flow of air through the apertures in said one end wall and through the openings in said partition into the foodstuff compartment, at least one receptacle for receiving a mold retardant in fluid form positioned in said foodstuff compartment adjacent to the openings in the partition so that the air from the blower passing through the openings in the partition will pass over the mold retardant and entrain some of it in substantially vapor form, the mold retardant laden air being forced by the blower to travel the entire length of the foodstuff compartment to pass over and deposit upon the foodstuff at least some of the mold retardant in the air, the apertures in the other end wall of said end walls cooperating with the blower to induce said flow of air over the foodstuff but occupying a relatively small area of said other end wall so that the major portion of the mold retardant laden air will impinge upon the blank area of said other end wall so that the direction of travel of the mold retardant laden air will be substantially reversed to cause the air to pass again over the foodstuff to deposit more of the mold retardant on the foodstuff.

4. A foodstuff preserving box as claimed in claim 3, wherein the container also includes a front and rear wall, two receptacles are positioned in the foodstuff compartment adjacent the partitions in spaced relation to one another, one of said receptacles adapted to receive a mold retardant material in fluid form and disposed adjacent said front wall and the other of said receptacles adapted to receive water or a mold retardant material in fluid form and disposed adjacent said rear wall, openings in the partition being arranged in three groups, one group of openings being positioned to direct the air in a stream over said one receptacle to entrain fluid therefrom, a second group of openings being positioned to direct the air in a second stream over said other receptacle to entrain fluid therefrom, and the third group of openings being positioned to direct the air in a third stream between the space between the two receptacles and the apertures in said other end wall being arranged in a group in longitudinal alignment with the third group of openings in the partition so that the first air stream laden with mold retardant material will travel longitudinally through the foodstuff compartment adjacent said front wall over the foodstuff, the second air stream laden with mold retardant material or water will travel longitudinally through the foodstuff compartment adjacent said rear wall and the third air stream will travel longitudinally through the foodstuff compartment and escape to the outside atmosphere through the apertures in the said other wall to cooperate with said third group of openings and the blower to induce the flow of the three air streams through the foodstuff compartment, the first and second air streams at the end of their longitudinal travel through the foodstuff compartment will impinge upon the blank areas on each side of the apertures in said other end wall so that their direction of travel will be substantially reversed and they will travel back longitudinally through the foodstuff compartment to deposit further mold retardant material on the foodstuff.

5. A foodstuff preserving box as claimed in claim 4, wherein said container includes a cover having depending flanges movably mounted on said container to move between an open position to afford access to the two compartments to a closed position in which the flanges frictionally engage said end walls and front and rear walls to provide an air tight seal for the container.

6. A foodstuff preserving box as claimed in claim 5, wherein a desiccant is removably attached to the inner face of said cover, means are provided for removably retaining the desiccant in place, and means are provided for masking and unmasking the apertures in said other end wall.

References Cited

UNITED STATES PATENTS

| | | | |
|---|---|---|---|
| 1,076,464 | 10/1913 | Stiriz | 99—271 |
| 1,867,640 | 7/1932 | Widders | 15—257. |
| 1,938,378 | 12/1933 | Ell | 15—257. |
| 2,176,140 | 10/1939 | Lofgren | 15—257.1 X |
| 2,784,662 | 3/1957 | Grosz | 99—271 |
| 1,282,251 | 10/1918 | Lueders | 99—249 |
| 2,039,313 | 5/1936 | Haas | 99—234 |
| 2,047,973 | 7/1936 | Lawton et al. | 21—74 |
| 2,065,895 | 12/1936 | Jandak | 21—82 |
| 2,192,348 | 3/1940 | James | 21—74 |
| 2,490,344 | 12/1949 | Fisher | 21—91 |
| 3,076,745 | 2/1963 | Eames | 21—109 |

ROBERT W. JENKINS, *Primary Examiner.*